United States Patent [19]

Anderson

[11] Patent Number: 4,895,483
[45] Date of Patent: Jan. 23, 1990

[54] CEILING PANEL REVEALER DEVICES AND METHODS

[76] Inventor: Carl E. Anderson, 4680 NE. Indian River Dr., Jensen Beach, Fla. 33457

[21] Appl. No.: 732,282

[22] Filed: May 9, 1985

[51] Int. Cl.[4] ............................................. B23C 3/28
[52] U.S. Cl. .................................... 409/132; 409/137; 409/212; 409/218; 144/134 B; 144/136 R
[58] Field of Search ............... 409/137, 132, 174, 182, 409/189, 201, 202, 209, 211, 212, 218, 232, 234; 144/252 R, 134 B, 136 C, 371; 51/273; 408/67, 68; 29/DIG. 78, 84

[56] References Cited

U.S. PATENT DOCUMENTS

| | | | |
|---|---|---|---|
| 1,462,234 | 7/1923 | Laughlin | 144/136 R X |
| 1,942,873 | 1/1934 | Narrow | 409/218 X |
| 2,520,116 | 8/1950 | Christenson | 144/134 B |
| 3,770,031 | 11/1973 | Olson | 144/134 B X |
| 4,051,880 | 10/1977 | Hestily | 144/252 R |
| 4,355,557 | 10/1982 | Mecsey | 144/134 D |

*Primary Examiner*—Z. R. Bilinsky
*Attorney, Agent, or Firm*—Caroll F. Palmer

[57] ABSTRACT

Devices for resizing ceiling tiles and like panels with the simultaneous creation of a reveal edge thereon comprises a table unit having a quadrilateral, flat top work surface and a pair of spaced apart, parallel tubular guide members supported on the table unit above the work surface in a plane parallel thereto. The work surface has an elongated slot therein extending longitudinally between the guide members. There is a motor driven cutter unit comprising a depending rotary cutter element and a pair of lateral slide parts contoured to rest upon and slide longitudinally along the guide members supporting the cutter unit between the guide members with a portion of its cutter element extending into the work surface slot. The device additionally has a suction unit that includes a conduit with an inlet juxtaposed to the cutter element and above the work surface through which debris created by operation of the cutter unit is removed as the device is operated.

Methods for resizing ceiling tiles and like panels with the simultaneous creation of a reveal edge thereon using such devices are disclosed.

11 Claims, 2 Drawing Sheets

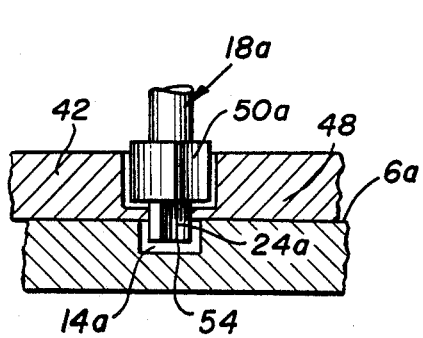
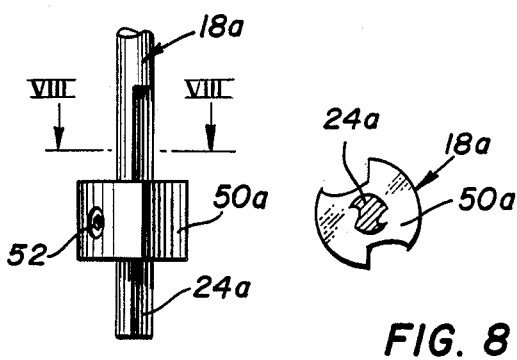
FIG. 6    FIG. 7    FIG. 8
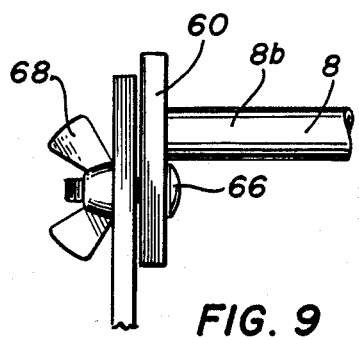
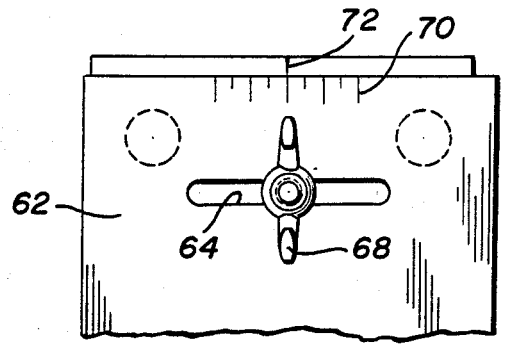
FIG. 9    FIG. 10
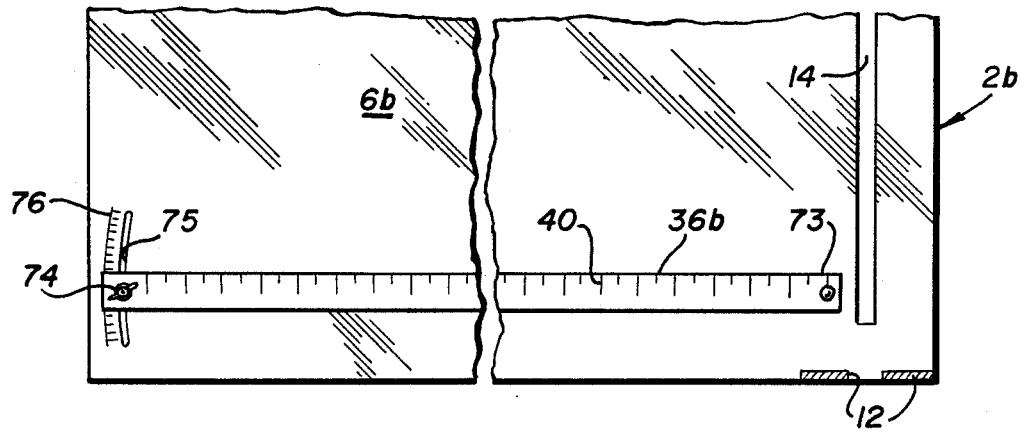
FIG. 11

CEILING PANEL REVEALER DEVICES AND METHODS

BACKGROUND OF THE INVENTION

1. Field of the Invention

This invention relates broadly to devices and methods for cutting ceiling panels to resize them to accommodate installation space requirements. More particularly, it concerns new equipment and methods for resizing ceiling tiles and like panels with the simultaneous creation of a reveal edge thereon so the panel may be immediately installed in the required space.

2. Description of the Prior Art

The need to resize ceiling tiles or like panels by cutting them along one or more sides occurs constantly during the installation of such panels since cost areas to be covered by the installed panels do not present dimensions that can be precisely filled without need to alter the size of at least some of the installed panels.

The resizing of ceiling panels has historically been a tedious operation because of the dust and other debris that is invariably produced by the resizing operation. Frequent need to make out-of-square cuts also has complicated on site resizing of the panels. Further, a special problem is presented to installers by the popular tegular tiles which include reveal (cut ledge) edges since, when the side of a tegular tile is cut to resize it, a reveal must be created on the new edge that will conform in appearance, e.g., in depth and width, to the uncut edges of the original panel.

A variety of suggestions have been advanced to try to improve on the panels resizing operations. The present invention provides additional advances in equipment and methods for carrying out such panel resizings.

One feature of the new devices of the invention is the use therein of rotary cutters having a plurality of cutter portions of different radius. Basically, cutters of such type are known as shown by prior U.S. patents, including:

| 3,303,862 | Westenberger | 1967 |
| 4,145,159 | Yamada | 1979. |

This invention uses this general type rotary cutter in new combinations to provide improved panel resizing devices.

It is also known to cut and reshape panels or the like with machines in which power-driven cutter elements are rotated about an axis normal to the panel while the elements move relatively across a surface of the panels as shown by prior U.S. patents, including:

| 2,615,479 | Bearup | 1952 |
| 3,812,891 | Reuter | 1974 |
| 4,244,669 | Puritz, etal. | 1981. |

This invention uses this general type rotary cutter elements in new combinations to provide improved panel resizing devices.

Further, a table saw type device for the resizing of ceiling panels has been offered for sale under the name "Reveal Border Saw" by the Specialty Products Division of La Cross Acoustical Tile, of La Crosse, Wisconsin. This invention provides devices distinguished from such prior equipment by improved construction and operation.

OBJECTS

A principal object of this invention is the provision of new devices and methods for resizing ceiling tiles and like panels by cutting a portion off one or more sides of the tiles.

A further object is the provision of such devices that simultaneous create a reveal thereon along the newly cut edge.

An additional object is the provision of such devices and methods that (a) mitigate dust and debris collection on or about the work piece and (b) reduce the time required to resize panels in comparison to conventional hand cutting.

A further object is the provision of unique cutter bits that assist in carrying out the new tile resizing operations.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are, in part, accomplished by the present invention by the provision of devices for resizing ceiling tiles and like panels which comprise a table unit having a quadrilateral, flat top work surface and a pair of spaced apart, parallel tubular guide members supported on the table unit above the work surface in a plane parallel thereto. The work surface has a longitudinal slot therein extending substantially parallel to and between the guide members. There is a motor driven cutter unit comprising a depending rotary cutter element and a pair of lateral slide parts contoured to rest upon and slide longitudinally along the guide members supporting the cutter unit between the guide members with a portion of its cutter element extending into the work surface slot. The device additionally has a suction unit that includes a conduit with an inlet juxtaposed to the cutter element and above the work surface through which debris created by operation of the cutter unit is removed as the device is operated.

In preferred embodiments of the new devices, the guide members are supported by uprights fixed to the table unit, the table unit includes a straightedge adjustably connected to the top of said work surface, the straightedge includes measurement indicia and the cutter motor is controlled by a foot switch.

Also, in such embodiments, a portion of the conduit serves as a handle to move the cutter unit along the guide members, the slide parts comprise lateral extensions of a plate on the upper surface of which the drive motor of the cutter unit is mounted. Further, the cutter element extends normally of the plate on the side thereof opposite to the drive motor and the rotary cutter element comprises a upper cutter portion having a larger cutting radius than an integral lower cutter portion with the upper cutter portion serving to produce a reveal on the newly cut edge of the panel as it is severed by the cutter element.

Additionally, preferred embodiments include rotary cutter bits having an adjustable feature to accommodate tegular tiles of varying thickness.

The objects are also, in part, accomplished by new methods for resizing ceiling tiles and like panels with the simultaneous creation of a reveal edge thereon using such devices.

BRIEF DESCRIPTION OF THE DRAWINGS

A more complete understanding of the invention may be had by reference to the accompanying drawings in which:

FIG. 6 is an enlarged, fragmentary sectional view similar to FIG. 5 of another embodiment of the invention.

FIG. 7 is a fragmentary lateral view of a special cutter bit of the invention.

FIG. 8 is sectional view taken on the line VIII—VIII of FIG. 7.

FIG. 9 is an fragmentary, lateral view of angle adjustment means for the guide members of the new tile cutter devices for use in making out-of-square tile cuts.

FIG. 10 is a distal end view of the angle adjustment means of FIG. 9.

FIG. 11 is a fragmentary plan view of another embodiment of a work surface of the new cutters device with adjustable angle straightedge for use in making out-of-square tile cuts.

DESCRIPTION OF THE PREFERRED EMBODIMENTS

Figure 1:
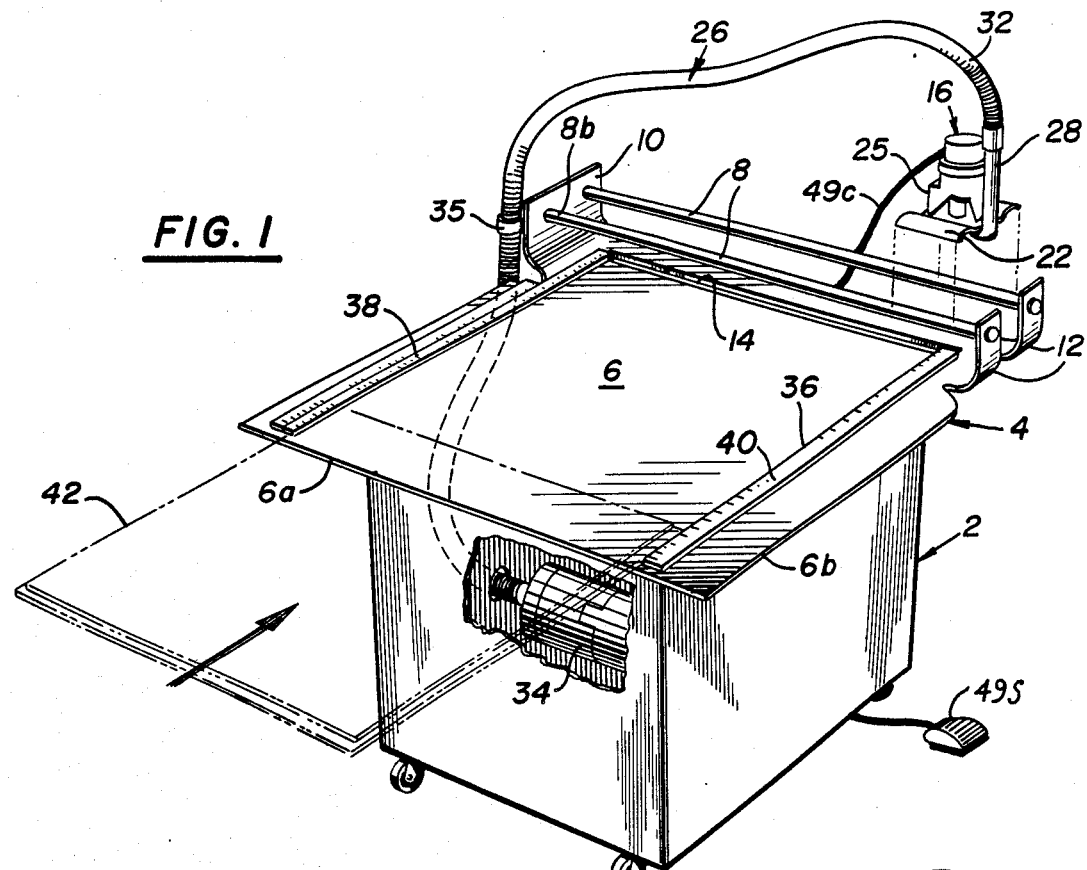
FIG. 1 is an isometric view of a new ceiling panel revealer device constructed in accordance with the invention.
Figure 2:
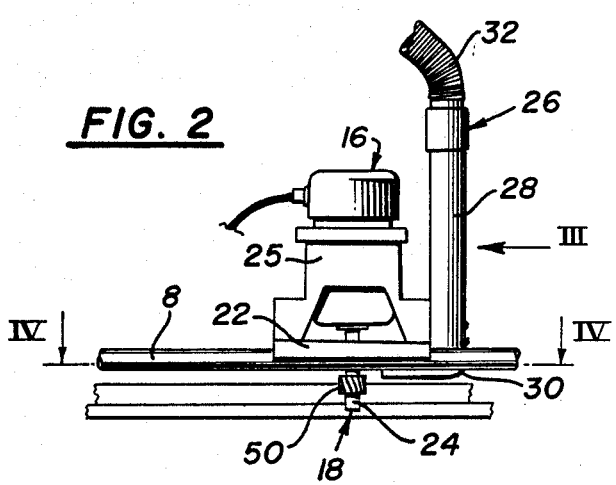
FIG. 2 is a lateral view of the cutter unit and related sections of the device shown in FIG. 1.
Figure 3:
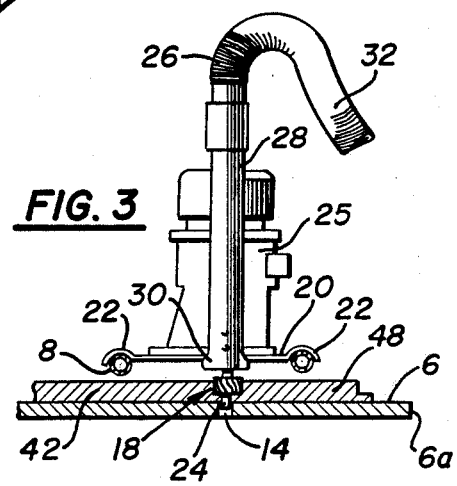
FIG. 3 shows the device viewed from the right side of FIG. 2 in the direction of the arrow III.

Referring in detail to the drawings, the device 2 of the invention comprises a table unit 4 having a flat top, work surface 6 defined by a pair of longitudinal sides 6a and a pair of lateral sides 6b.

A pair of spaced apart, parallel tubular guide members 8 are supported on table unit 4 by uprights 10 and 12 above work surface 6 in a plane parallel to surface 6 and an adjacent table edge 6a.

A longitudinal slot 14 in work surface 6 extends across a major portion of the width of the surface 6 and substantially parallel to and between guide members 8.

There is a motor driven cutter unit 16 comprising a depending rotary cutter element 18 and a support plate 20 having a pair of lateral slide parts 22 contoured to rest upon and slide longitudinally along guide members 8 supporting said cutter unit 16 between the guide members 8 with the lower portion 24 of cutter element 18 extending into the table slot 14. The power motor 25 is fixed to the top of plate 20 with its attached cutter element 18 depending from the bottom side of plate 20.

Figure 4:
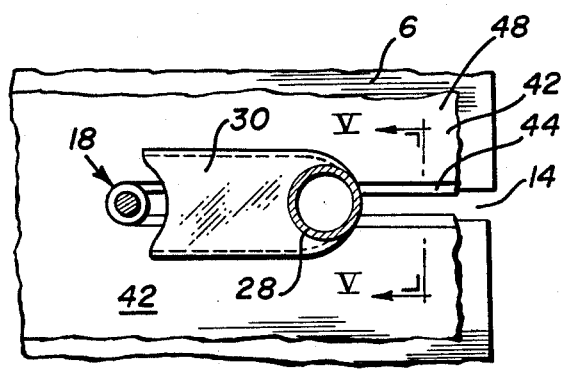
FIG. 4 is a sectional view taken on the line IV—IV of FIG. 2.

The device 2 further comprises suction means 26 to remove debris (not shown) created by operation of cutter unit 16. The suction means 26 includes a conduit 28 with an inlet 30 carried by the cutter unit 16 juxtaposed to cutter element 18 and above work surface 6 (see FIG. 4). The suction means also includes a flexible hose 32 that connects the conduit 28 to the suction pump 34. Preferably, a ring 35 with an I.D. slightly larger than the O.D. of the hose 32 is supported by the upright 10 to slideably retain the hose 32 rearward of the work area.

Straightedges 36 & 38 are provided on work surface 6 and these may include measurement indicia 40. They may be permanently fixed to the surface 6 or structured for movement, e.g., to move apart or together to accommodate different width ceiling panels 42 or to assist in making out-of-square cuts as will be explained further below.

A method of resizing a ceiling panel 42 and simultaneously creating a reveal 44 on a new edge 46 begins by supporting the panel 42 to be resized on work surface 6. The side 48 of the panel 42 to be resized is positioned on the surface 6 so the the new edge to be created is aligned above with the slot 14. The cutter unit 16 is then placed on the proximal ends 8a of the guide members 8 using the conduit 28 as a handle for its manipulation.

The cutter unit 16 is then energized through its power cord 49C and is pushed along the guide members 8 toward their distal ends 8b with the result that the cutter element 18 cuts off the unwanted end portion 48 of panel 42. In this process, the cutter element 18 passes along slot 14 as it moves longitudinally along guide members 8 so the panel is cut along a path defined by the opening 14.

A foot switch 49S is advantageously used to control the application of electrical current to the power cord so that the operator of the device 2 will have better hand control in the resizing of tiles.

The cutter element 18 comprises an upper cutter portion 50 having a larger cutting radius than an integral lower cutter portion 24. In the resizing operation, the upper cutter portion 50 serves to produce a reveal 44 having reveal edge 45 on the newly cut panel edge 46 as the panel 42 is severed by the cutter element 18. At the same time, dust and other debris are constantly removed from the cutting area via the inlet end 30 of suction means 26.

Tegular and other ceiling panels come in a variety of widths, e.g., typically the distance between the top surface 42T (see FIG. 5) and the bottom surface 42B will vary between about 0.5 and 0.875 inch. Likewise the dimensions of the revealing of the tile will vary, e.g., the length of the reveal edge 45 may be about 0.188 to 0.375 width and the width of the reveal edge between about 0.25 to 0.5 inch. Hence, the new devices and methods must be capable of making varied size cuts in the tile edge so that the new edges of the resized tiles will substantially duplicate the original. Accordingly, the cutter elements 18 must be capable of cutting reveals 44 and reveal edges 45 of various dimensions.

Figure 5:
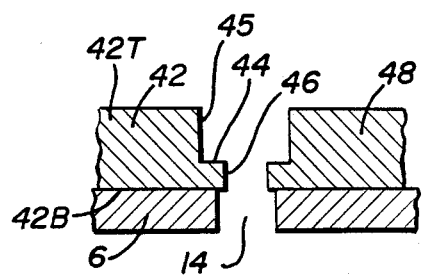
FIG. 5 is an enlarged, fragmentary sectional view taken on the line V—V of FIG. 2.

In the devices 2 of the invention in which the slot 14 extends through the work surface 6 as shown in FIG. 5, the variations in reveal 44 sizing may be attained using a series of cutter elements with different size upper cutter portions 50 and in reveal edge 45 sizing by the depth to which the lower edge of the cutter portion 50 is allowed to approach the work surface 6.

Some embodiments of the invention may have work surfaces 6a (see FIG. 6) in which the slot 14a extends only part way into the surface 6. Hence, the length of the reveal edge 45 can not be adjusted by the simple raising or lowering of the cutter element 18a relative to the work surface 6a. Accordingly, the cutter element 18a has upper cutter portion 50a that is moveable relative to the lower cutter portion 24a by the manipulation of the Allen screw 52. Thus, the lower tip 54 of the cutter element 18a may always be positioned above the bottom of the slot 14a, while the height of the upper cutter portion 50a above the work surface 6a may be varied to adjust for different reveal edge sizes.

Another cutting adjustment required of the new devices and methods is to permit out-of-square resize edges to be made in the ceiling tiles 42. Such special angled cuts (SA cuts) are required, for example, where tiles abut the walls of a room that are not precisely square to one another. It is to be noted that SA cuts must take into consideration not only the new angle, other than 90°, that will be made in the tile, but also the distance the new tile edge will be from its opposite edge. Several embodiments of the invention are provided for doing this.

With reference to FIGS. 9 & 10, SA cuts may be made using an arrangement for varying the angle of the guide members 8 relative to the work surface 6. In this embodiment, the distal ends 8b of the guide tubes 8 are fixed in a plate 60 which is supported on the standard 62 which, in turn, is fixed to the top of the work surface 6. The standard 62 has a horizontal slot 64 therein through which a bolt 66 attached to plate 60 extends. A wing nut 68 enables the plate 60 to be clamped in any one of a number of positions designated by indicia 70 on the standard 62 and 72 on the plate 60 whereby the angle of the guide tubes 8 may be varied relative to work surface 6. The indicia 70 are calibrated for reference to cutting instructions to enable a user of the equipment to make proper SA cuts from linear measurements at the work site.

Another embodiment of the invention including a SA cut feature is shown in FIG. 11. Here, the angled positioning of a ceiling tile or other panel is obtained by the use of an angularly moveable staightedge 36b in the device 2b. Instead of the straigthedge 36b being fixed to the working surface 6b, it can be pivoted at end 73 and be provided at the other end with wing-nut clamp 74 which moves in slot 75 in the table top so that the straight edge can be moved and clamped in a variety of angles relative to the slot 14. The work surface 6b bears a series of indicia 76 calibrated to permit the user to set the angle of the straightedge 40b at the necessary angle considering the required angle for the new reveal edge of the resized tile and the length of such new edge from the opposed edge in the final resized tile.

It will be apparent from the foregoing disclosure that the new devices and methods of the invention can quickly and cleanly resize ceiling tiles or like panels while simultaneously forming a reveal on its newly created edge. The invention permits this to be accomplished by one workman more effectively, cleanly and accurately than is possible using conventional hand cutting methods.

The embodiments of the invention in which an exclusive property or privilege is claimed are defined as follows:

1. A device for resizing ceiling panels with simultaneous creation of a new reveal edge which comprises:
    a table unit having a quadrilateral, flat top work surface,
    a pair of spaced apart, parallel tubular guide members supported on said table unit above said work surface in a plane parallel thereto,
    an elongated slot in said work surface extending longitudinally between said guide members,
    a motor driven cutter unit comprising
        a depending rotary cutter element,
        a pair of lateral slide parts contoured to rest upon and slide longitudinally along said guide members supporting said cutter unit between said guide members with a portion of said cutter element extending into said slot,
    a straightedge connected to the top of said work surface normal to said guide members and said slot, and
    suction means to remove debris created by operation of said cutter unit, said suction means including
        a conduit with an inlet carried by said cutter unit juxtaposed to said cutter element and above said work surface.

2. The device of claim 1 wherein said guide members extend substantially parallel to an edge of said work surface.

3. The device of claim 1 wherein said guide members are supported by uprights fixed to said table unit.

4. The device of claim 1 wherein said straightedge includes measurement indicia.

5. The device of claim 1 wherein a portion of said conduit serves as a handle to move said cutter unit along said guide members.

6. The device of claim 1 wherein said slide parts comprise lateral extensions of a plate on the upper surface of which the drive motor of said cutter unit is mounted.

7. The device of claim 6 wherein said cutter element extends normally of said plate on the side thereof opposite to said drive motor.

8. The device of claim 7 wherein said rotary cutter element comprises a upper cutter portion having a larger cutting radius than an integral lower cutter portion, said upper cutter portion serving to produce a reveal on the newly cut edge of the panel as it is severed by the cutter element.

9. A device for resizing ceiling panels with simultaneous creation of a new reveal edge which comprises:
    a table unit having a rectangular flat top work surface,
    a pair of spaced apart, parallel tubular guide members supported on said table unit above said work surface in a plane parallel thereto,
    an elongated slot in said work surface extending longitudinally between said guide members,
    a straightedge connected to the top of said work surface at an angle to said guide members and said slot,
    a motor driven cutter unit comprising
        a depending rotary cutter element,
        a pair of lateral slide parts contoured to rest upon and slide longitudinally along said guide members supporting said cutter unit between said guide members with a portion of said cutter element extending into said slot,
    suction means to remove debris created by operation of said cutter unit, said suction means including
        a conduit with an inlet carried by said cutter unit juxtaposed to said cutter element and above said work surface, and
    means to vary said angle between said straightedge and said guide members.

10. A device for resizing ceiling panels with simultaneous creation of a new reveal edge which comprises:
    a table unit having a rectangular flat top work surface, a pair of spaced apart, parallel tubular guide members supported on said table unit above said work surface in a plane parallel thereto, an elongated slot in said work surface extending longitudinally between said guide members, a straightedge pivoted to the top of said work surface at its end that is adjacent to said slot to permit it to slide across said work surface and be clamped at varying angles relative to said guide members, indicia on said work surface to indicate predetermined positioning of said angle of said straightedge relative to said guide members, a motor driven cutter unit comprising
- a depending rotary cutter element,
- a pair of lateral slide parts contoured to rest upon and slide longitudinally along said guide members supporting said cutter unit between said guide members with a portion of said cutter element extending into said slot, suction means to remove debris created by operation of said cutter unit, said suction means including
- a conduit with an inlet carried by said cutter unit juxtaposed to said cutter element and above said work surface, and means to vary said angle between said straightedge and said guide members.

11. A method of resizing a ceiling panel and simultaneously creating a new reveal edge thereon which comprises:

supporting a ceiling panel to be resized on a horizontal, flat work surface above which a pair of spaced apart, parallel tubular guide members are positioned in a plane parallel thereto, there being a longitudinal slot in said work surface extending substantially parallel to and between said guide members, positioning said panel on said work surface so a edge thereof that is to be severed in resizing of the panel is aligned with said slot, supporting a motor driven cutter unit comprising a depending rotary cutter element between and upon said guide members via a pair of Lateral slide parts contoured to rest upon and slide longitudinally along said guide members with a portion of said cutter element extending into said slot, passing said cutter element along said slot by moving said cutter unit longitudinally along said guide members so the cutter element severs said panel along a path defined by said slot, and removing cuttings as created by operation of said cutter unit via suction means that includes a conduit with an inlet carried by said cutter unit juxtaposed to said cutter element and above said work surface.

* * * * *